Dec. 8, 1964  H. RYFFEL  3,160,416
CENTRIFUGALLY BIASED FLOATING SEAL RING OF HELICAL SPRING FORM
Filed March 29, 1963  3 Sheets-Sheet 1
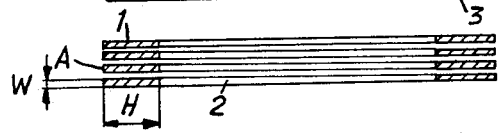
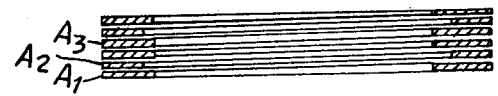
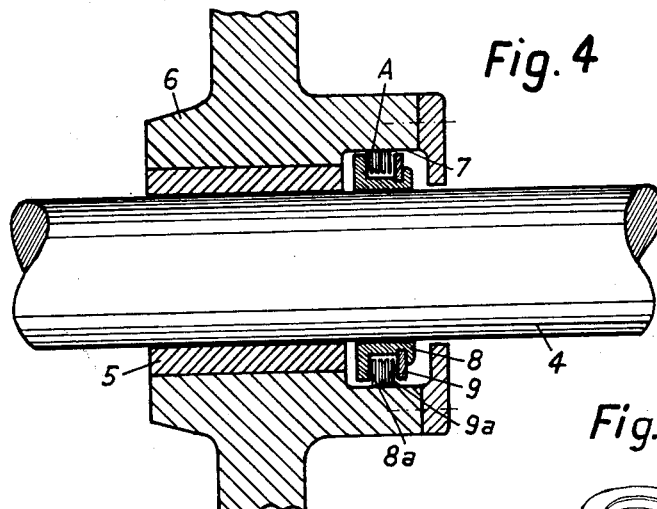
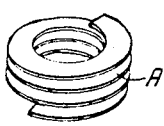
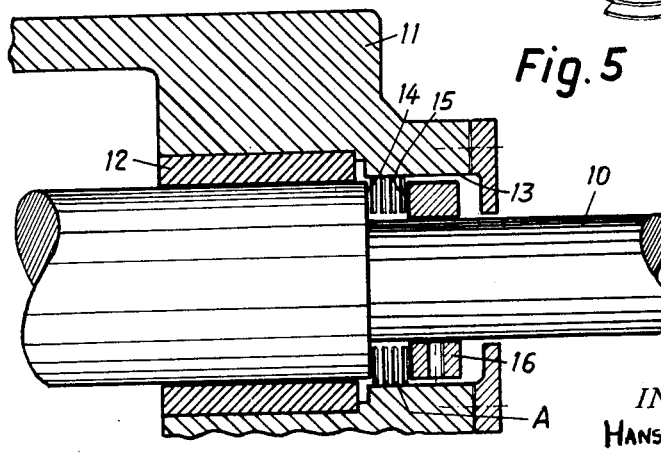
INVENTOR.
Hans Ryffel
BY *Wormald Kleeman*
ATTORNEY

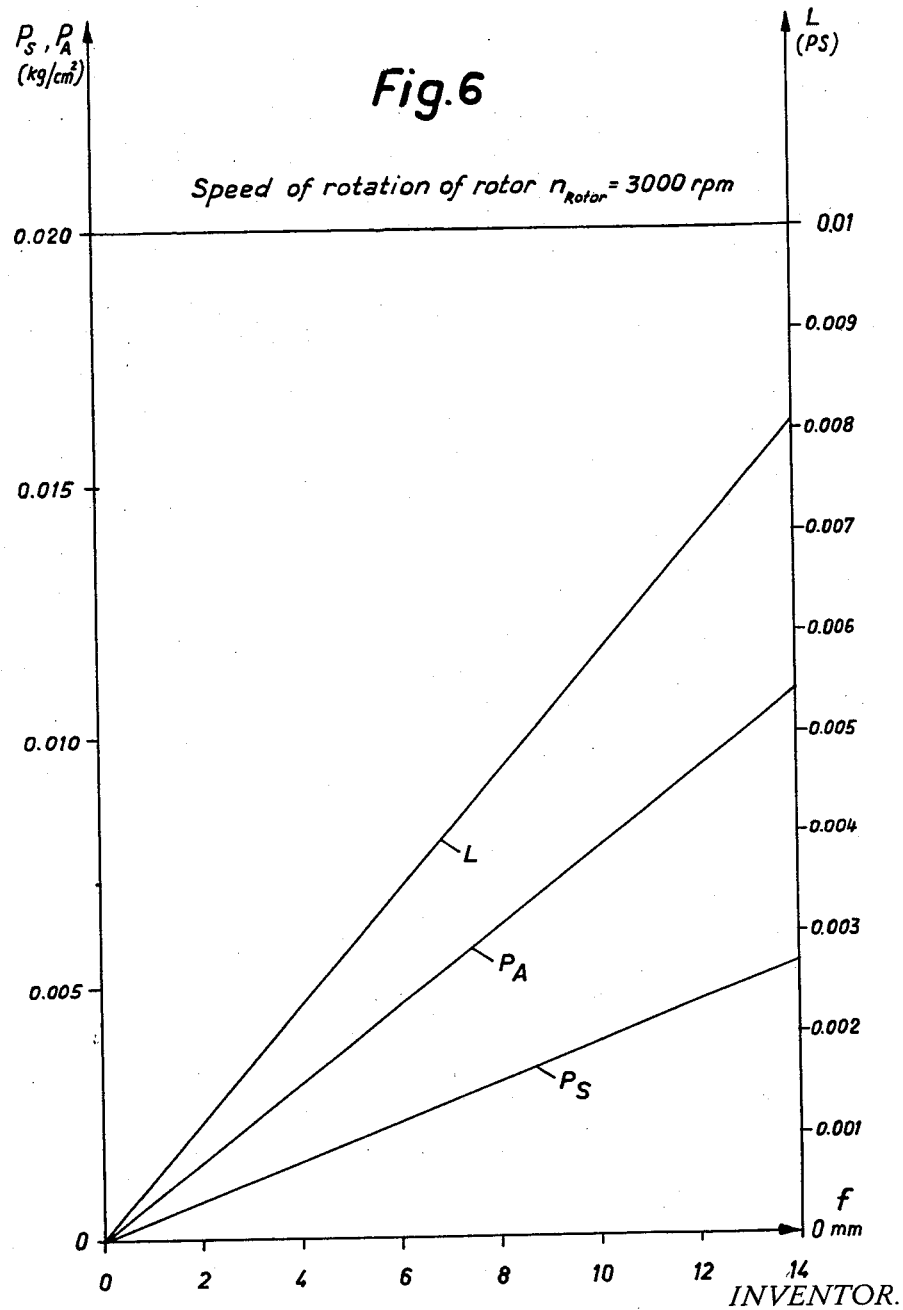

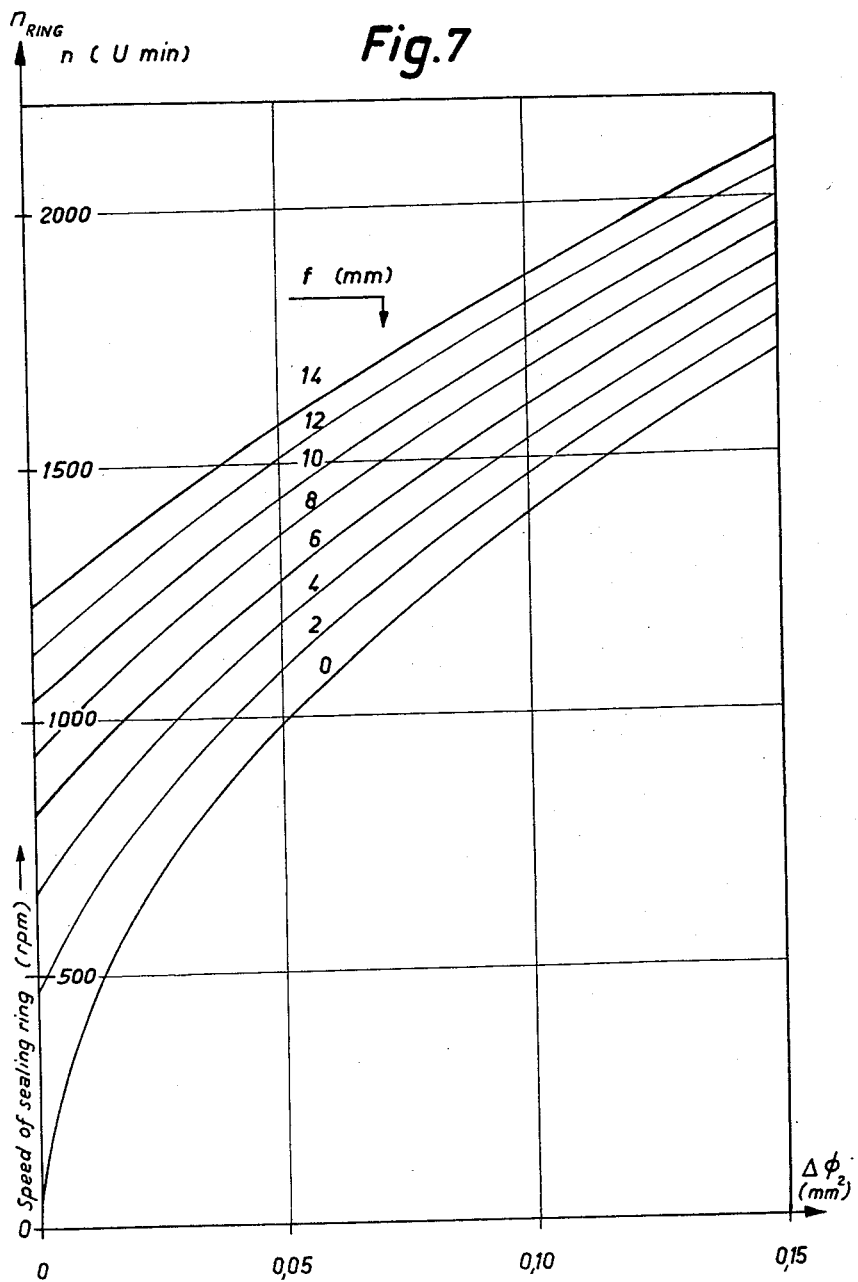

United States Patent Office 3,160,416
Patented Dec. 8, 1964

3,160,416
CENTRIFUGALLY BIASED FLOATING SEAL RING OF HELICAL SPRING FORM
Hans Ryffel, Zurich, Switzerland, assignor to Dr. G. Dätwyler, Zurich, Switzerland, a citizen of Switzerland
Filed Mar. 29, 1963, Ser. No. 269,100
11 Claims. (Cl. 277—1)

The present invention relates to a sliding ring sealing element and, more particularly, to an improved method of, and sliding ring seal for, sealing the gap between a pair of relatively rotatable members, especially for preventing passage of a gaseous medium through said gap.

The sealing of a gap between two bodies rotatable in relation to one another, for example a shaft and a housing, despite the improvements achieved in lengthy and extensive developments, still constitutes a problem which up to the present has not been solved satisfactorily. Apart from the wear phenomena produced in operation in so-called sliding ring seals, which are utilised to an increased extent today in large machine constructions, difficulties also arise with respect to space requirements and variation of the sealing properties under the influence of changing operational temperature.

The sliding ring seal designed in accordance with the present invention, which is to serve for sealing a gap defined on an external stationary body by a cylindrical surface, is distinguished by the fact that the sealing element possesses at least one ring of helical spring form, which is elastically deformable in the axial and radial directions and possesses approximately plane and parallel lateral boundary surfaces. The boundary surfaces of the sealing ring are intended to cooperate with radial surfaces which are rotationally connected with the rotating element. The moment of friction of the radial surfaces on the sealing ring during operation corresponding to the moment of friction of the cylindrical surface of the stationary body on the periphery of the ring resting against this cylindrical surface.

Due to the fact that the moments of friction which act from the rotating body and from the stationary body upon the sealing ring are approximately balanced in operation, the sealing ring has a speed of rotation which corresponds to the mean of the rotation speeds of the two bodies. Thus in the case of an external stationary body the speed of rotation of the sealing ring is approximately half of the speed of rotation of the internal rotating body.

As a result of the elasticity of the ring in the radial direction, the latter is in a position to widen out under the influence of the centrifugal force acting thereon due to its being entrained by the inner rotating body, and in so doing to press upon the cylindrical surface of the outer stationary body with gradually increasing pressure. Thus while the ring exerts no pressure or only a little pressure on the outer part when the inner part is stationary, this pressure increases with increasing rotational speed until equilibrium of the moments of friction is achieved. This has the advantage that the starting torque of the machine or of the rotation body is influenced only to a slight extent by the sealing element.

According to a further embodiment of the present invention the sealing ring which is in the form of a helical spring, is inserted in a further support member or ring possessing an approximately U-shaped outwardly open cross-section. The inner lateral surfaces of the U-profile facing one another which are parallel, in this case cooperate in sealing fashion with the outer boundary surfaces of the sealing ring. A sealing element of this type is especially suitable for securing on a shaft, and indeed in such a manner that the sealing ring provided with the U-profile is rotationally rigidly mounted on the shaft. Alternatively it is also possible to form the radial surfaces, which cooperate with the lateral boundary surfaces of the sealing ring possessing helical spring form, by providing appropriate shoulders on the rotating part. However, in this case, one such shoulder must be provided on a second part subsequently mounted on the rotating part. The sealing element can also be formed by a plurality of rings of helical spring form, wherein the turns of one ring are arranged in the interspace between the turns of the other rings.

Thus a primary object of the present invention is to provide an improved sealing element for sealing a gap or spacing formed between an internal rotating body and an external stationary body, especially against the passage of a gaseous medium.

Another important object of the present invention contemplates providing a sliding ring seal which has small space requirements and is readily capable of ensuring a long working life due to reduction of wear.

A further object of the present invention is to provide an improved sealing element between relatively rotatable members wherein the starting torque of the rotating member is influenced only to a minimal extent by the sealing element.

Still a further important object of the present invention is to provide improved seal means between relatively rotating bodies, and an improved method of sealing a gap between said rotating bodies.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 is a cross-sectional view of a sliding ring sealing element according to the present invention;

FIGURE 2 is a cross-sectional view of another form of sliding ring sealing element;

FIGURE 3 is a cross-sectional view of a further embodiment of sliding ring sealing element;

FIGURE 4 illustrates a sliding ring sealing element according to a further embodiment constructed as a shaft seal, in the form of a structural unit;

FIGURE 4a is a perspective view of the sealing ring in accordance with the present invention;

FIGURE 5 shows a further embodiment of the sliding ring sealing element;

FIGURE 6 diagrammatically illustrates different operational values of a sliding ring sealing element according to FIGURE 1, as a function of the initial tension and FIGURE 7 shows a diagram of the rotational speed of the sealing ring as a function of the axial initial tension and of the diameter clearance in relation to the cylindrical surface of the stationary body.

Referring now to the drawings, and as may readily be seen by inspecting FIGURE 1, the sealing ring generally designated by reference numeral A consists of a helical spring provided with a plurality of convolutions or turns, with said turns possessing a rectangular cross-section. At the end faces or boundary surfaces 1, 2 of the sealing ring A there are formed the free ends of the spring convolutions, whereby the tapering free ends are preferably cut at a still adequate thickness. The free ends of the spring can also be bent-off inwards slightly in relation to the inner turns of the spring, in order to achieve a gradual transition into the plane of the end faces or boundary surfaces 1 and 2. In order to keep the gap appearing in the peripheral direction at the end face in each case between the cut-off free end and the end face itself as small as possible, the turn or convolution immediately adjacent to the spring end can also possess a reduction of width, so that the termination of the spring end comes to lie on this part of relatively slight thickness.

In the case of the sealing ring according to FIGURE 2 a closed or annular ring 3, similarly of rectangular cross-section, is placed upon the surface intended for sealing, which annular ring 3 can be connected with the end of the spring which forms the sealing ring A. For example, the annular ring 3 can be connected to the end of the spring A by hard soldering or welding or even by riveting. In the illustrated embodiment according to FIG. 3, the sealing ring consists of three helical springs $A_1$, $A_2$ and $A_3$ disposed one within the other. The helical spring $A_2$ here possesses a smaller profile height or larger internal diameter than the helical springs $A_1$ and $A_3$.

The sealing rings as illustrated in FIGURES 1–3 can all be formed of spring steel. After the winding of the springs with a uniform spacing between the individual turns, they are ground to roundness on the periphery, namely to a pre-determined diameter. Similarly, the end faces 1, 2 are ground flat, so that as far as possible a continuous surface of movement or bearing surface is produced on at least one side.

The installation of the sealing rings is illustrated in FIGURES 4 and 5. It is to be understood that any of the sealing rings illustrated in FIGURES 1–3 can be employed in the sealing arrangements of FIGURES 4 and 5. In FIGURE 4, reference numeral 4 designates a shaft which is rotatably mounted in a bearing 5 of a housing 6. In its bearing eye or bearing-receiving compartment the housing 6 forms a surface, preferably a cylindrical sealing surface 7, which is widened in relation to the area of the bearing, with which there cooperates a sealing ring A at its periphery. The sealing ring A in this embodiment is set into a two-part retaining ring 8, 9 provided with U-shaped outwardly open cross-section, which cooperates at its two inner lateral surfaces 8a and 9a facing one another with the end srufaces of the sealing ring A. The retaining or mounting ring 8, 9 is secured on the rotatable shaft 4, for example by pressing.

In FIGURE 5 there is again shown a shaft passage in a housing, the shaft being designated by reference numeral 10, the housing by 11 and the bearing by 12. The sealing ring A coordinates at its periphery with a cylindrical surface 13 formed in the bearing eye or bearing-receiving compartment of the housing 11. On the other hand, the lateral end face or boundary surfaces of the sealing ring A press against a shoulder 14 formed on the shaft 10 and a radial surface 15 of a set collar or adjusting ring 16. The set collar 16 is fitted exactly onto the shaft 10, so that its sealing ring contact surface 15 lies in a radial plane. In this embodiment the members 14, 15 function as support or retaining means for the sealing ring A.

In operation the described sealing ring behaves as follows:

As a result of the axial initial tension or pretension to which the spring is subjected in installation in the support or retaining ring 8, 9 (FIGURE 4) or between the spring retaining or support surfaces 14, 15 (FIGURE 5), the sealing ring A is in frictional driving connection with the shaft 4 (FIGURE 4) or shaft 10 (FIGURE 5). The external diameter of the sealing ring A is generally made smaller than the internal diameter of the cylindrical surface 7 (FIGURE 4) or surface 13 (FIGURE 5) by a small amount. For example, the sealing ring A can possess an external diameter in a range of tolerance which together with the internal diameter of the corresponding sealing surface on the stationary body 6 or 11 produces a tight fit or a running fit, whereby however in every case the friction moment exerted by the rotating member 4 or 10 upon the sealing ring A must be greater, regarded from the static position, than the friction moment exerted by the stationary body 6 or 11 on the periphery of said sealing ring. If now the machine is set in operation and the shaft 4 or 10 rotates accordingly with increasing speed, the sealing ring A is firstly driven to the corresponding extent. However, due to the rotation of the sealing ring A the centrifugal force now commences to act thereon, so that the convolution turns thereof widen out in the direction of an increasing diameter. Thus with increasing rotational speed the pressure exerted by the sealing ring A upon the cylindrical surface 7 or 13 increases and, similarly, the friction moment which this surface again exerts upon the sealing ring increases to a corresponding extent. With increasing rotational speed, thus, the sealing ring A is then braked in relation to the shaft 4 or 10, so that finally an equilibrium is established between the friction moment on the stationary body 6 or 11 and that in relation to the shaft 4 or 10. At this point the rotational speed of the sealing ring A remains approximately constant with constant rotational speed of the shaft 4 or 10. This rotational speed of the sealing ring A preferably amounts to approximately half the rotational speed of the shaft 4 or 10.

Obviously it would also be possible to install the sealing ring A between two bodies rotating in relation to a third member, which themselves carry out a rotation in relation to one another. As long as the sealing ring is subjected to a centrifugal force it will increase its pressure against the cylindrical surface and in so doing improve the sealing effect in comparison with the stationary condition.

In the graphs depicted in FIGURES 6 and 7 there is illustrated the operational behavior of a sealing ring A with the following dimensions: The width (W) of the rectangular spring wire is 0.8 mm., the height (H) about 4 mm. (see FIGURE 1). The spring wire is wound or ground to form a spring with an external diameter of 67.9-e8 (ISA), the inner diameter of which amounts to 62 mm. In the compressed state the spring exhibits a height of 3.5 mm. As clearly appears from the diagram according to FIGURE 6, for which a rotor rotational speed ($N_{Rotor}$) of 3000 r.p.m. was assumed, lateral pressure ($P_s$ in kg./cm.$^2$), radial pressure ($P_A$ in kg./cm.$^2$) and the power loss (L in horse power)—all of which are plotted along the ordinate of this graph—increase linearly with increasing spring initial tension ($f$ in mm.), plotted along the abscissa of said graph. From FIGURE 7 there may further be seen the influence of the diameter play ($\Delta\phi$ in mm.), plotted along the abscissa of the graph—between the spring and the cylindrical sealing surface, upon the rotational speed of the sealing ring ($N_{Ring}$ in r.p.m.)—plotted along the ordinate—at different axial initial spring tensions ($f$ in mm.).

Obviously, the described seal can be used not only for shaft passages through housings, but it is also possible, for example in rotary pumps or motors, to seal off pressure chambers in relation to chambers with lower pressure or atmospheric pressure. The sealing ring is here preferably arranged in a peripheral groove formed of two parts on the rotor.

Having thus described the present invention, what is desired to be secured by United States Letters Patent, is:

1. A method of sealing a gap formed between a pair of relatively rotatable members by means of a helically wound spring-shaped sealing element, particularly against the axial passage of gaseous medium through said gap, comprising the steps of: mounting said sealing element for rotation in said gap on a rotatable member of said pair of relatively rotatable members, with the periphery of said sealing element spaced at a small clearance from said other relatively rotatable member, applying an axial initial tension to said sealing element to exert via said rotatable member a moment of friction on said sealing element which in the static condition of said relatively rotatable members is greater than the moment of friction exerted on said sealing element by said other relatively rotatable member, then imparting rotational movement to said rotatable member and therewith also to said sealing element in order to apply centrifugal force to said sealing element to expand such radially with increasing pressure in the direction of said other relatively rotatable member and to an extent sufficient to brake said sealing element relative to said rotatable member, whereby an equilibrium condition is reached between the moment of friction of said rotatable member on said sealing element and the moment of friction of said other relatively rotatable member on the periphery of said sealing element, said sealing element thereby assuming a rotational speed which is approximately equal to the mean of the rotational speeds of said relatively rotatable members, with said sealing element sealing said gap.

2. A method of sealing a gap formed between a pair of relatively rotatable members by means of a helically wound spring-shaped sealing element, particularly against the axial passage of gaseous medium through said gap, comprising the steps of: mounting said sealing element for rotation in said gap on a rotatable member of said pair of relatively rotatable members, with the periphery of said sealing element spaced at a small clearance from said other relatively rotatable member to provide a running fit, pretensioning said sealing element to exert via said rotatable member a moment of friction on said sealing element which in the static condition of said relatively rotatable members is greater than the moment of friction exerted on said sealing element by said other relatively rotatable member, thereafter imparting rotational movement to said rotatable member and therewith also to said sealing element in order to apply centrifugal force to said sealing element to expand such radially in the direction of said other relatively rotatable member to provide sealing pressure therebetween and to an extent sufficient to brake said sealing element relative to said rotatable member, whereby an approximately equilibrium condition is reached between the moment of friction of said rotatable member on said sealing element and the moment of friction of said other relatively rotatable member on the periphery of said sealing element, said sealing element thereby assuming a rotational speed which is approximately equal to the mean of the rotational speeds of said relatively rotatable members, with said sealing element sealing said gap.

3. A method of sealing a gap formed between a pair of relatively rotatable members by means of a helically wound spring-shaped sealing element, particularly against the axial passage of gaseous medium through said gap, one of said relatively rotatable members being an internal rotatable body and the other being an external stationary body provided with a cylindrical surface serving to limit the extent of said gap, which method comprises the steps of: mounting said sealing element for rotation in said gap on said internal rotatable body, with the periphery of said sealing element spaced at a small clearance from said cylindrical surface of said external stationary body, applying an axial initial tension to said sealing element to exert via said internal rotatable body a moment of friction on said sealing element which in the static condition of said relatively rotatable members is greater than the moment of friction exerted on said sealing element by said cylindrical surface of said external stationary body, thereafter imparting rotational movement to said internal rotatable body and therewith also to said sealing element to expand such radially with increasing pressure in the direction of said cylindrical surface of said external stationary body, whereby an approximately equilibrium condition is reached between the moment of friction of said internal rotatable body on said sealing element and the moment of friction of said cylindrical surface of said external stationary body on the periphery of said sealing element, said sealing element thereby assuming a rotational speed which is less than the rotational speed of said internal rotatable body, with said sealing element sealing said gap.

4. A method of sealing a gap formed between a pair of relatively rotatable members by means of a helically wound spring-shaped sealing element, particularly against the axial passage of gaseous medium through said gap, one of said relatively rotatable members being an internal rotatable body and the other being an external stationary body provided with a cylindrical surface serving to limit the extent of said gap, which method comprises the steps of: mounting said sealing element for rotation in said gap on said internal rotatable body, with the periphery of said sealing element spaced at a small clearance from said cylindrical surface of said external stationary body to provide a running fit, applying an axial initial tension to said sealing element to exert via said internal rotatable body a moment of friction on said sealing element which in the static condition of said relatively rotatable members is greater than the moment of friction exerted on said sealing element by said external stationary body, thereafter imparting rotational movement to said internal rotating body and therewith also to said sealing element to expand such radially with increasing pressure in the direction of said cylindrical surface of said external stationary body and an extent sufficient to brake said sealing element relative to said internal rotatable body, whereby an approximately equilibrium condition is reached between the moment of friction of said internal rotatable body on said sealing element and the moment of friction of said cylindrical surface of said external stationary body on the periphery of said sealing element, said sealing element thereby assuming a rotational speed which is approximately equal to one-half the rotational speed of said internal rotatable body, with said sealing element sealing said gap.

5. In combination, a pair of relatively rotatable members spaced from one another to define a gap which is to be sealed, particularly against the passage of a gaseous medium, a sliding ring sealing element adapted to seal said gap, means for supporting said sealing element in said gap and between said relatively rotatable members, said sealing element comprising at least one helically wound spring-shaped ring member which is elastically deformable in the axial and radial directions, said sealing element being provided with approximately plane and parallel lateral end surfaces, said supporting means for said sealing element being mounted to be operatively rotatable together with one of said relatively rotatable members and includes radial surfaces which bear against said lateral end surfaces of said sealing element, such that the moment of friction of said radial surfaces on said sealing element corresponds during operation to the moment of friction of the other relatively rotatable member on the periphery of said sealing element resting against said other relatively rotatable member.

6. The combination defined in claim 5; wherein said helically wound spring-shaped ring member comprises a plurality of successively arranged convolutions, each of which possess a cross-section of erected rectangular form.

7. The combination defined in claim 5; wherein said sealing element comprises a plurality of helically wound spring-shaped ring members, with the convolutions thereof disposed one within the other.

8. The combination defined in claim 5; wherein said supporting means comprises a support ring of U-shaped cross-section forming an outwardly open peripheral groove for receiving said sealing element and having confronting inner faces defining said radial surfaces which bear against said lateral end surfaces of said sealing element.

9. The combination defined in claim 5; wherein said supporting means for said sealing element is defined by a surface portion of said one relatively rotatable member and by a spacedly arranged set collar mounted on the last-mentioned rotatable member, to thereby form an outwardly open peripheral groove for receipt therein of said sealing element.

10. The combination defined in claim 5; wherein said other relatively rotatable member includes a cylindrical surface limiting the confines of said gap and against which the periphery of said sealing element bears for sealing of said gap.

11. In combination, a pair of relatively rotatable members spaced from one another to define a gap which is to be sealed, particularly against the passage of a gaseous medium, said relatively rotatable members comprising an internal rotatable body and an external stationary body provided with a cylindrical surface limiting said gap, a sliding ring sealing element adapted to seal said gap, means for supporting said sealing element in said gap and between said internal rotatable body and said cylindrical surface of said external stationary body, said sealing element comprising at least one helically wound spring-shaped ring member which is elastically deformable in the axial and radial directions, said sealing element being provided with approximately plane and parallel lateral end surfaces, said supporting means for said sealing element being arranged to be operatively rotatable together with said internal rotatable body and includes radial surfaces which bear against said lateral end surfaces of said sealing element, such that the moment of friction of said radial surfaces on said sealing element corresponds during operation to the moment of friction of said cylindrical surface of said external stationary body on the periphery of said sealing element resting thereagainst.

References Cited by the Examiner

UNITED STATES PATENTS 2,871,072  1/59  Parks et al. _____ 277—203

FOREIGN PATENTS 395,969  7/33  Great Britain.
902,815  8/62  Great Britain.

EDWARD V. BENHAM, *Primary Examiner.*